(12) United States Patent
Ollila

(10) Patent No.: US 7,667,372 B2
(45) Date of Patent: Feb. 23, 2010

(54) DRIVING CIRCUIT FOR PIEZOELECTRIC MOTOR

(75) Inventor: Mikko Ollila, Tampere (FI)

(73) Assignee: Nokia Corporation, Espoo (FI)

( * ) Notice: Subject to any disclaimer, the term of this patent is extended or adjusted under 35 U.S.C. 154(b) by 0 days.

(21) Appl. No.: 11/150,833

(22) Filed: Jun. 10, 2005

(65) Prior Publication Data
US 2005/0280332 A1 Dec. 22, 2005

(30) Foreign Application Priority Data
Jun. 11, 2004 (FI) ................................. 20045217

(51) Int. Cl.
*H02N 2/06* (2006.01)
(52) U.S. Cl. .................... 310/319; 310/316.03; 310/317
(58) Field of Classification Search .................. 310/319, 310/314, 316.01–316.03, 317, 318
See application file for complete search history.

(56) References Cited

U.S. PATENT DOCUMENTS

| | | | | |
|---|---|---|---|---|
| 4,044,297 | A |   | 8/1977 | Nobue et al. .................... 323/4 |
| 4,404,502 | A |   | 9/1983 | Magori et al. ................. 318/116 |
| 4,568,849 | A |   | 2/1986 | Sato et al. ..................... 310/316 |
| 4,732,129 | A |   | 3/1988 | Takigawa et al. ............. 123/478 |
| 4,841,191 | A |   | 6/1989 | Takata et al. .................. 310/317 |
| 5,130,598 | A |   | 7/1992 | Verheyen et al. ............. 310/316 |
| 5,146,071 | A | * | 9/1992 | Ookubo et al. ............. 250/201.2 |
| 5,444,310 | A |   | 8/1995 | Kataoka et al. ............... 307/125 |
| 5,739,679 | A | * | 4/1998 | Takehara et al. ............. 323/299 |
| 5,917,267 | A | * | 6/1999 | Miyazawa et al. ........... 310/317 |
| 5,969,464 | A |   | 10/1999 | Nakano et al. ................ 310/328 |
| 6,060,814 | A |   | 5/2000 | Hoffmann et al. ...... 310/316.03 |
| 6,512,321 | B2 | * | 1/2003 | Yoshida et al. .......... 310/316.01 |
| 6,563,251 | B2 |   | 5/2003 | Jansson et al. .......... 310/316.03 |

(Continued)

FOREIGN PATENT DOCUMENTS

DE 19858250 A1 6/2000

(Continued)

OTHER PUBLICATIONS

"Sahkolaitostekniikan Perusteet", Jarmo Elovaara et al., Otakustantamo 499, Karisto Oy, Hameenlinna, 1988, p. 289, Figure 9.43.

(Continued)

*Primary Examiner*—Walter Benson
*Assistant Examiner*—Derek J Rosenau
(74) *Attorney, Agent, or Firm*—Ware, Fressola, Van Der Sluys & Adolphson LLP

(57) ABSTRACT

In a method and a device according to the present invention, two piezo-elements of a piezo-electric actuator are driven with two voltages having a mutual phase difference. One of said piezo-elements is charged by a capacitive voltage step-up means to a voltage exceeding an available power supply voltage. A capacitor is coupled to the piezo-element, which divides the voltage of the piezo-element and simultaneously transfers part of the energy stored in the piezo-element to said capacitor. A part of the energy transferred to said capacitor is later transferred back to said piezo-element, providing an energy-saving feature. The second piezo-element is driven in a similar way providing the required phase difference. In a further embodiment, the waveforms of the two driving signals are corrected using balancing capacitors.

18 Claims, 7 Drawing Sheets

U.S. PATENT DOCUMENTS

| | | | |
|---|---|---|---|
| 6,747,394 B2 * | 6/2004 | Johansson et al. | 310/323.02 |
| 6,943,785 B2 * | 9/2005 | Chou et al. | 345/204 |
| 7,019,436 B2 * | 3/2006 | Rueger et al. | 310/316.03 |
| 2001/0035696 A1 | 11/2001 | Knowles et al. | 310/316.01 |
| 2002/0079785 A1 * | 6/2002 | Knowles et al. | 310/316.03 |
| 2002/0113563 A1 | 8/2002 | Jansson et al. | 318/116 |

FOREIGN PATENT DOCUMENTS

| | | |
|---|---|---|
| EP | 1001474 A1 | 5/2000 |
| WO | WO 02/067411 | 8/2002 |
| WO | WO 03/104874 | 12/2003 |

OTHER PUBLICATIONS

Patent Abstracts of Japan, publication No. 05174987, publication date—Jul. 13, 1993, "Light Source Lighting Device", K. Shozo, Matsushita Electric Works Ltd.

Patent Abstracts of Japan, publication No. 2000346684, publication date—Dec. 15, 2000, "Vortex Flowmeter", Y. Akio, Yokogawa Electric Corp.

Poyhonen O., (Sähkötekniikan käsikirja 2), Tammi 1979, Helsinki.

* cited by examiner

DRIVING CIRCUIT FOR PIEZOELECTRIC MOTOR

CROSS-REFERENCE TO RELATED APPLICATIONS

This application claims priority under 35 USC §119 to Finnish Patent Application No. 20045217 filed on Jun. 11, 2004.

FIELD OF THE INVENTION

The present invention relates to an energy-saving piezo-element driving device and a method for driving piezo-elements. The present invention relates also to a device comprising a piezo-element driving device.

BACKGROUND OF THE INVENTION

Piezo-electric actuators are used in imaging systems to adjust the positions of zoom and focusing lens systems. Piezo-electric actuators are also used in other systems to move small objects. Driving devices providing suitable driving voltages are required to operate said piezo-electric actuators. Piezo-electric actuators are implemented by using one or more piezo-elements, which are deflected, expanded or contracted when coupled to an activating voltage.

An aspect in mobile devices is that the voltage of an available power supply is typically lower than the optimum driving voltage of the piezo-elements. Driving voltages higher than the power supply voltage are typically generated using voltage step-up means, which are coupled to the piezo-elements to provide charge transfer to and from said voltage step-up means. Further, in mobile systems, the available power supply is typically a battery with a limited capacity. Therefore energy consumption related to the driving of piezo-elements is a problem especially in mobile systems.

A piezo-element comprises a substantial internal capacitance, which stores energy when the piezo-element is charged by coupling to a driving voltage. U.S. Pat. No. 6,563,251 discloses a driving device for an actuator having a capacitive motor phase. Said patent teaches that energy liberated from a piezo-element during discharging operations may be stored to be used in subsequent charging operations. Said patent discloses the use of a set of voltage sources to charge/discharge a piezo-element in an energy-efficient way. At least one of the voltage sources may be capacitively buffered to provide a further energy-saving feature. A voltage step-up device is used to increase the driving voltage.

SUMMARY OF THE INVENTION

It is an object of the present invention to provide an energy-saving device and method for driving piezo-elements, and a device comprising an energy-saving piezo-element driving device. A further object of the present invention is to simplify the voltage step-up means required to implement a piezo-element driving device.

According to a first aspect of the invention, a piezo-element driving unit comprises at least:
an output connectable to a piezo-element,
voltage step-up means,
first switching means to connect said voltage step-up means to said output,
at least one capacitor, and
second switching means to connect said at least one capacitor to said output, said first switching means, said second switching means and/or further switching means further providing means to disconnect said at least one capacitor from said voltage step-up means.

According to a second aspect of the invention, a piezo-element driving device comprises at least two piezo-element driving units, said at least two units being controlled by a common control unit and powered by a common power supply, each of said piezo-element driving units comprising at least:
an output connectable to a piezo-element,
voltage step-up means,
first switching means to connect said voltage step-up means to said output,
at least one capacitor, and
second switching means to connect said at least one capacitor to said output, said first switching means, said second switching means and/or further switching means further providing means to disconnect said at least one capacitor from said voltage step-up means.

According to a third aspect of the invention, there is a method to drive a piezo-element comprising at least the steps of:
Increasing the voltage of a power supply using voltage step-up means,
transferring charge from said voltage step-up means to said piezo-element, and
performing charge transfer between at least one capacitor and said piezo-element, said at least one capacitor being disconnected from said voltage step-up means during said charge transfer.

According to a fourth aspect of the invention, there is a device comprising at least one piezo-element driving device and at least one piezo-electric actuator, said piezo-element driving device comprising one or more piezo-element driving units, such a unit in turn comprising at least:
an output connectable to a piezo-element,
voltage step-up means,
first switching means to connect said voltage step-up means to said output,
at least one capacitor, and
second switching means to connect said at least one capacitor to said output, said first switching means, said second switching means and/or further switching means further providing means to disconnect said at least one capacitor from said voltage step-up means.

The devices and the method according to the present invention are mainly characterized in that charge transfer is performed between a piezo-element and at least one capacitor, said at least one capacitor being disconnected from the voltage step-up means during said charge transfer. Thus, a fraction of the capacitive energy stored in the piezo-element can be reused, which improves the energy efficiency. Further, the use of said at least one capacitor as an energy storage allows the use of an energy-efficient voltage step-up means comprising only a small number of components.

The embodiments of the invention and their benefits will become more apparent to a person skilled in the art through the description and examples given herein below, and also through the appended claims.

BRIEF DESCRIPTION OF THE DRAWINGS

In the following examples, the embodiments of the invention will be described in mode detail with reference to the appended drawings, in which.

DETAILED DESCRIPTION OF THE INVENTION

Figure 1A:
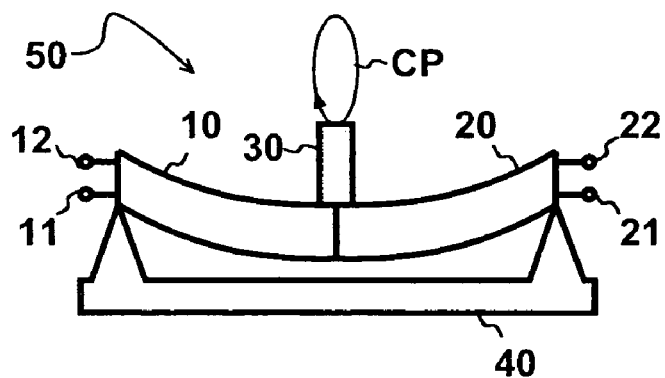
FIGS. 1a-1d show different operating phases of a piezo-electric actuator based on two independently deflectable piezo-elements, FIG. 2. shows the diagram of a piezo-element driving device according to the present invention.
Figure 1B:
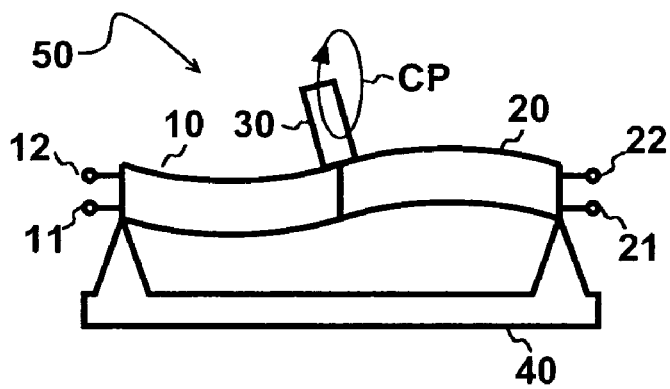
Figure 1C:
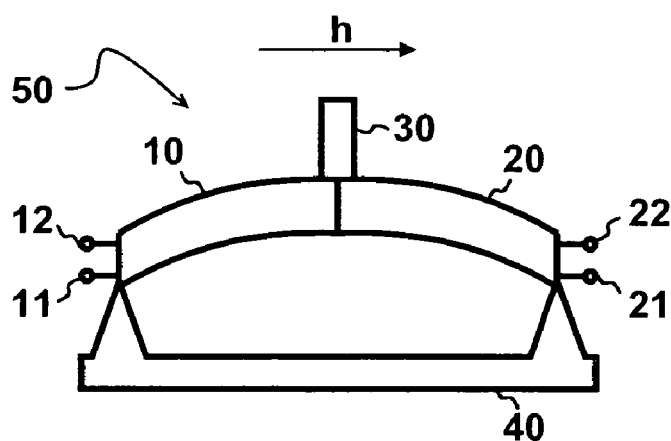
Figure 1D:
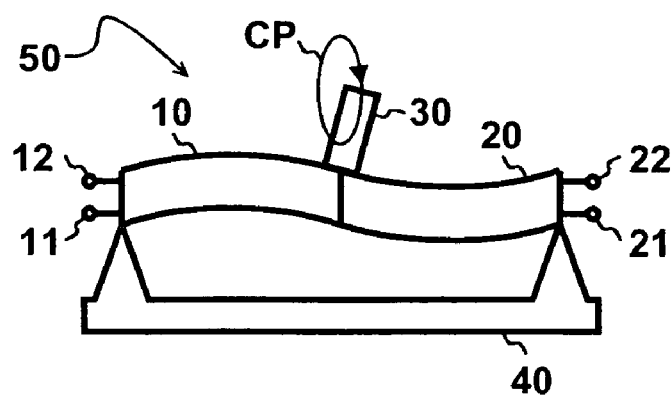

Referring to FIG. 1a, a piezo-electric actuator 50 may comprise two independently deflectable piezo-elements 10, 20, which have been connected together. A protrusion 30 is attached near the connection point of said two piezo-elements 10, 20. The piezo-elements 10, 20 are supported by a support 40, which allows the deflection of said piezo-elements 10, 20. The degree of deflection of each piezo-element 10, 20 is changed when a voltage is applied between voltage terminals 11, 12, 21, 22 of said piezo-elements 10, 20. The piezo-elements 10, 20 may be designed and optimized to be operated using unipolar voltages, i.e. with voltages in the range from zero voltage to a maximum voltage. The internal capacitances of the piezo-elements 10, 20 are preferably identical. Preferably, the piezo-electric actuator 50 is implemented using deflectable piezo-elements known as bimorphs by the person skilled in the art.

The degree of deflection of said two piezo-elements is changed in a cyclic manner when alternating voltages are coupled to the voltage terminals 11, 12, 21, and 22. The tip of the protrusion 30 moves along a closed path CP when there is a phase difference between the alternating voltages coupled to the two piezo-elements. Preferably, the phase difference should be 90 degrees. FIGS. 1a to 1d illustrate four different operating phases of the actuator 50. The closed path CP has been omitted in FIG. 1c to avoid the blurring of the drawing. When the tip of the protrusion 30 is positioned near an object (not shown), it may contact said object at least in the phase shown in FIG. 1c, and move said object to the direction h. The direction of the motion may be changed by reversing the sign of the phase difference, i.e. from 90 degrees to minus 90 degrees.

In an ideal case the driving waveforms would be sinusoidal. However, the piezo-elements 10, 20 are typically driven with voltages waveforms, which deviate considerably from the sinusoidal form. The phase difference may also deviate considerably from 90 degrees. The phase difference refers herein to a situation in which two voltages reach their maximum value and minimum values at different instants of time.

It is emphasized, that the use of the expression phase difference does not require herein that the waveforms of said two voltages must be identical.

Figure 2:
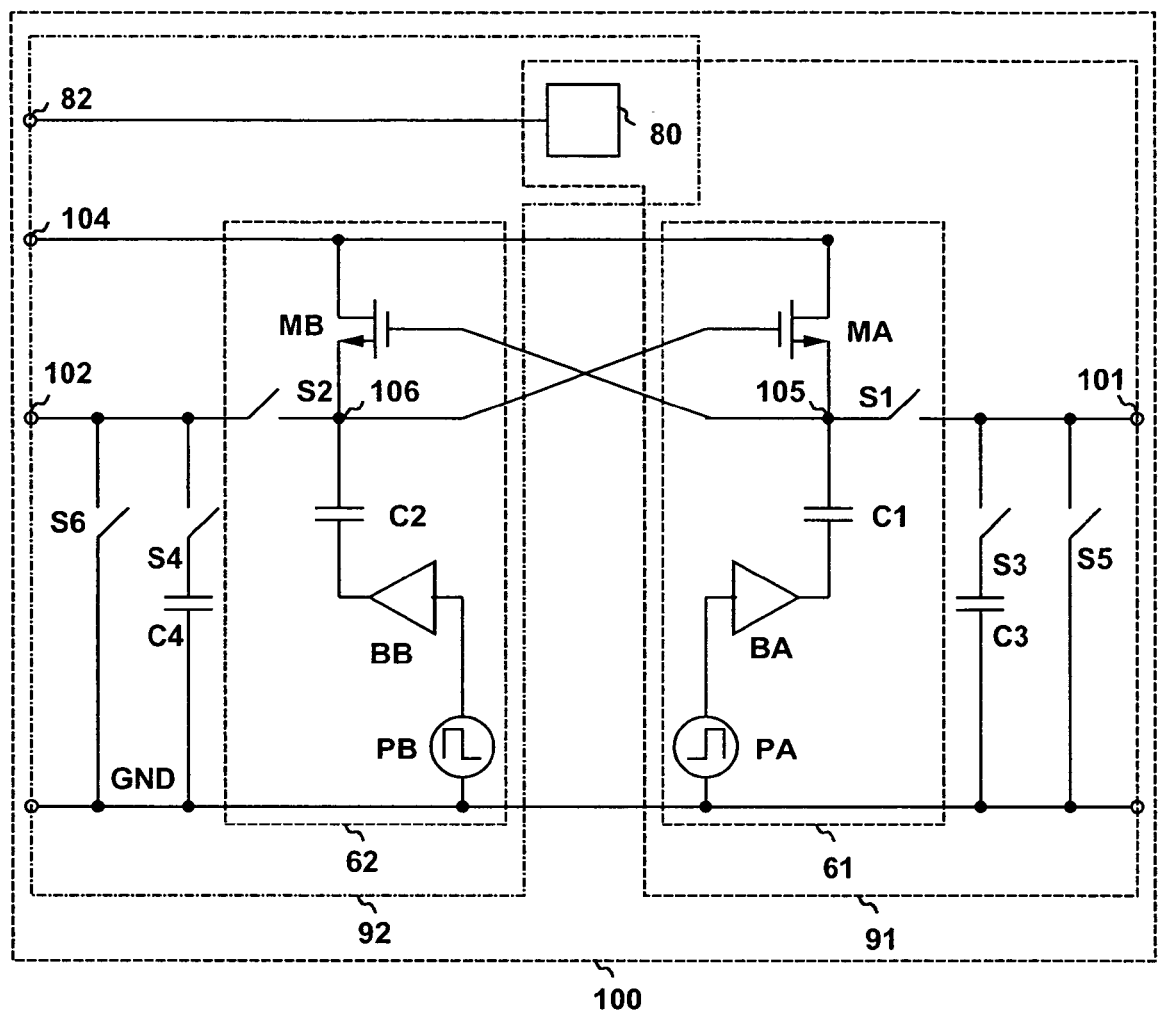

Referring to FIG. 2, the piezo-element driving device 100 comprises two piezo-element driving units 91, 92. Each piezo-element driving unit 91, 92 comprises capacitive voltage step-up means 61, 62, an output 101, 102, a switch S1, S2 to connect said capacitive voltage step-up means 61, 62 to said output 101, 102, a capacitor C3, C4, a switch S3, S4, to connect said capacitor to said output 101, 102 and a switch S5, S6 to connect said output 101, 102 to the ground GND. The piezo-element driving device 100 comprises also a control logic 80 and a power input 104, which are common to the both piezo-element driving units. 91, 92. The power input 104 is coupled to a power supply (not shown), which provides a voltage VS.

Each capacitive voltage step-up means 61, 62 is implemented using a pulse generator PA, PB, a buffer BA, BB providing current amplification, a capacitor C1 and C2 and a field-effect transistor MA, MB.

The driving signal for the field-effect transistor MA is obtained by coupling the gate of the transistor MA to the node 106 of the piezo-element driving unit 92. The gate of the transistor MB is coupled to the node 105 of the piezo-element driving unit 91, respectively.

The control logic 80 controls the switches S1, S2, S3, S4, S5 and S6 of the piezo-element driving device 100. The control logic 80 controls also the synchronization and the mutual phase difference of the pulse generators PA, PB. The control logic 80 receives command signals from a control unit (shown in FIG. 5) coupled to a signal input 82.

The first piezo-element 10 of the piezo-electric actuator 50 is coupled to a first output 101 and the second piezo-element 20 of the piezo-electric actuator 50 is coupled to a second output 102. Each piezo-element 10, 20 constitutes a substantially capacitive load.

Figure 3:
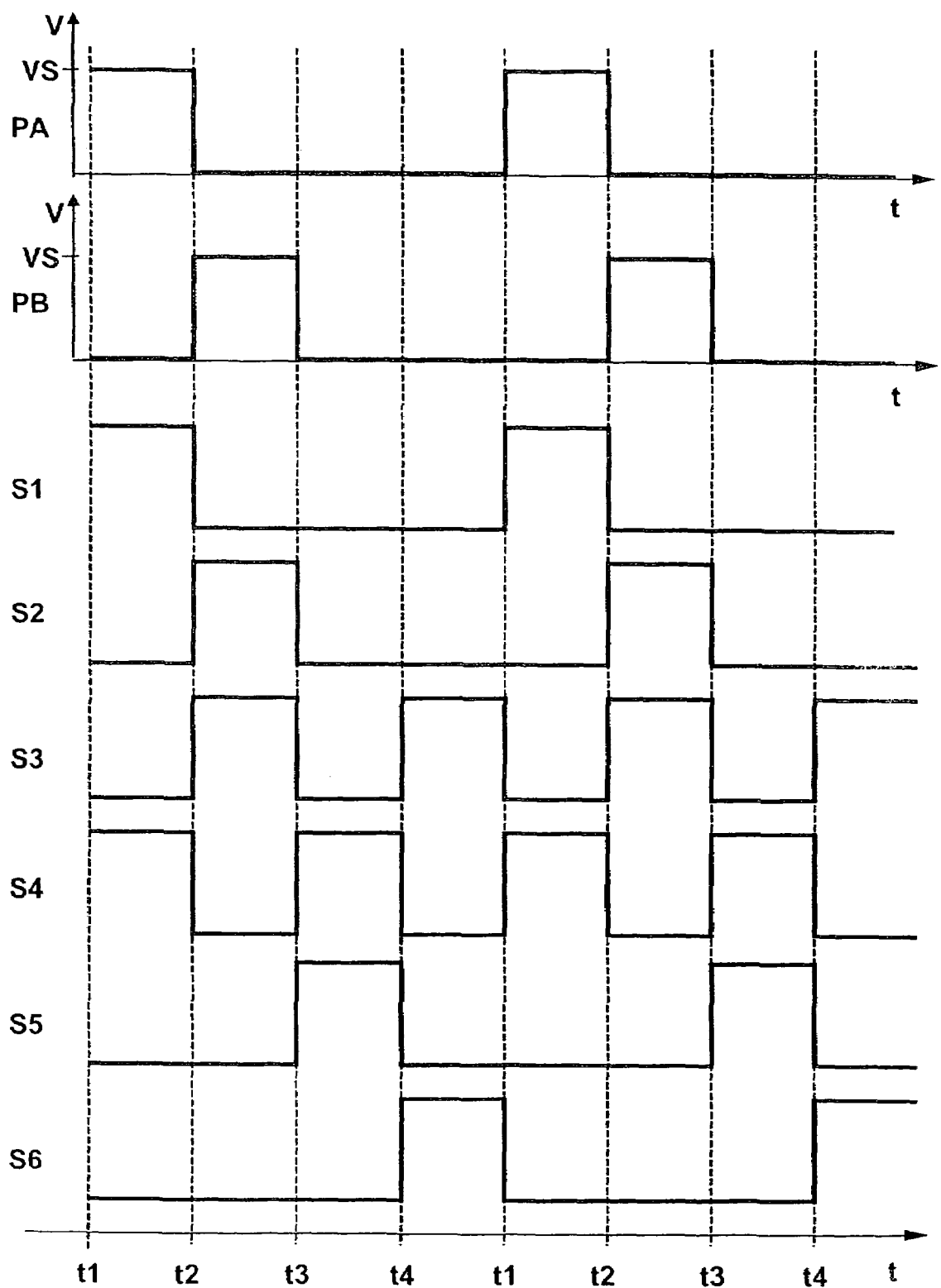
FIG. 3 shows by way of example the timing chart of the piezo-element driving device according to FIG. 2.

FIG. 3 is the timing chart showing the control voltages of the switches S1, S2, S3, S4, S5, S6 and the output voltages of the pulse generators PA, PB. The curves of FIG. 3 exhibit a high value/state and a low value/state. Regarding the switches S1, S2, S3, S4, S5, S6, the high state is associated with a closed switch and a low state is associated with an open switch. Regarding the pulse generators PA, PB, the high value denotes a value, which is substantially equal to the power supply voltage VS. The lower value denotes substantially zero voltage, i.e. the voltage at the ground GND. The marking t indicates time and the marking V indicates voltage.

The output signal of the pulse generator PA is buffered by the buffer BA. During operation, the output voltage of the pulse generator PA, and consequently also the output voltage of the buffer BA alternates substantially between the ground voltage and the power supply voltage VS. The field effect transistor MA is set to the conducting state when the output voltage of the buffer BA is substantially zero. Consequently, the capacitor C1 is charged to a voltage, which is substantially equal to the power supply voltage VS. Next, the transistor MA is set to the non-conducting state. When the output voltage of the pulse generator PA is substantially equal to the power supply voltage VS, the voltage generated by the capacitive voltage step-up means 61 is substantially equal to two times the power supply voltage VS. Thus, during operation, the voltage step-up means 61 generates voltages between VS and two times VS. The other voltage step-up means 62 generates voltages between VS and two times VS, respectively.

Figure 4:
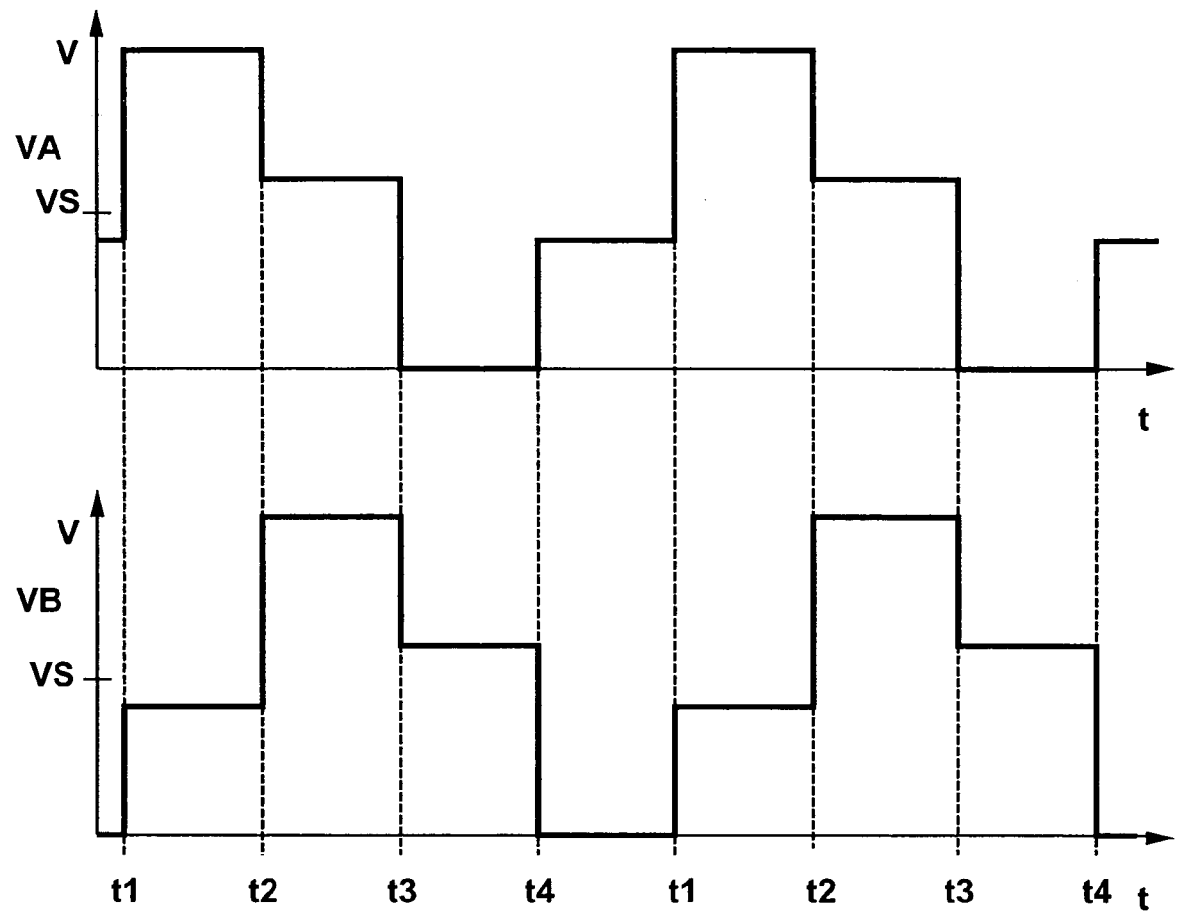
FIG. 4 shows by way of example the resulting voltage waveforms at the outputs of the piezo-element driving device according to FIG. 2.

FIG. 4. shows the resulting voltage waveforms at the outputs 101, 102 of the piezo-element driving device 100. VA denotes the voltage of the output 101 and VB denotes the voltage of the output 102.

The operation of the single piezo-element driving unit 91 is now described referring to four operating steps, which are repeated in a cyclic way. The markings t1, t2, t3 and t4 refer to the beginning of the first, second, third and fourth operating step of the first piezo-element driving unit 91. Unless mentioned, the switches S1, S3, and S5 are in the open (non-conducting) state.

In the first step, the voltage at the node 105 of the voltage step-up means 61 is equal to two times VS. The control logic 80 sends a command to close the switch S1. The output 101 is thus coupled to the node 105 of the voltage step-up means 61, charge is transferred to the first piezo-element 10, and the voltage of said first piezo-element 10 is substantially increased to the value two times VS. In the end of the first step, the switch S1 is opened.

In the second step, the switch S3 is closed. The output 101 is coupled to the capacitor C3. Charge is transferred from the first piezo-element 10 to the capacitor C3. The capacitance of the capacitor C3 is preferably approximately the same as the internal capacitance of the first piezo-element 10. However, there is a certain residual charge stored in the capacitor C3, and consequently the voltage of the output 101 is capacitively divided to a value, which is somewhat higher than VS. A part of the energy initially stored in the first piezo-element 10 is now stored in the capacitor C3. In the end of the second step, the switch S3 is opened.

In the third step, the switch S5 is closed, and consequently the first piezo-element 10 is coupled to the ground GND. The voltage of the output 101 is now substantially zero. In the end of the third step, the switch S5 is opened.

In the fourth step, the switch S3 is closed. The initial voltage of the capacitor C3 is slightly higher than VS. The output 101 is coupled to the capacitor C3. Charge is transferred from the capacitor C3 to the first piezo-element 10. The voltage of the output 101 is divided capacitively, and a part of the energy initially stored in the capacitor C3 is now transferred to the first piezo-element 10. In the end of the fourth step, the switch S3 is opened. Residual charge remains in the capacitor C3 for use in the next repeating cycle.

Now, the cycle described above repeats itself starting again from the first step, in which the first output 101 is again coupled to voltage generated by the voltage step-up means 61, said voltage being substantially equal to two times the power supply voltage VS.

The second piezo-element driving unit 92 is operated in a similar way by controlling the switches S2, S4 and S6. The required phase difference of the voltages of the outputs 101 and 102 is provided by the delay or advance of the timing of the switch control signals of the second piezo-element driving unit 92, with respect to the timing of the switch control signals of the first piezo-element driving unit 91.

The switches S1, S2, S3, S4, S5, S6, the pulse generators PA, PB and the control logic 80 may be implemented using various semiconductor-based technologies and devices known by the person skilled in the art. The switches may be implemented using, for example, metal oxide semiconductor field effect transistors or bipolar junction transistors.

A further embodiment of the piezo-element driving device 100 may be implemented using a plurality of capacitors C3, C4 and respective switching means S3, S4. A person skilled in the art can select the plurality of the capacitors C3, C4 and the timing of the respective switching means S3, S4 such that the generated voltage waveforms at the outputs 101, 102 substantially resemble a desired, for example triangular, waveform.

A further embodiment of the piezo-element driving device 100 may be implemented by cascading voltage step-up means to provide operating voltages which are for example four, six, eight times the voltage VS of the power supply.

In a further embodiment, further steps may be implemented, during which the capacitors C3, C4 are coupled to the voltage step-up means (61, 62) to exchange charge. A further switch (not shown) may be used to couple the capacitors C3, C4 directly to the voltage step-up means 61, 62.

Figure 5:
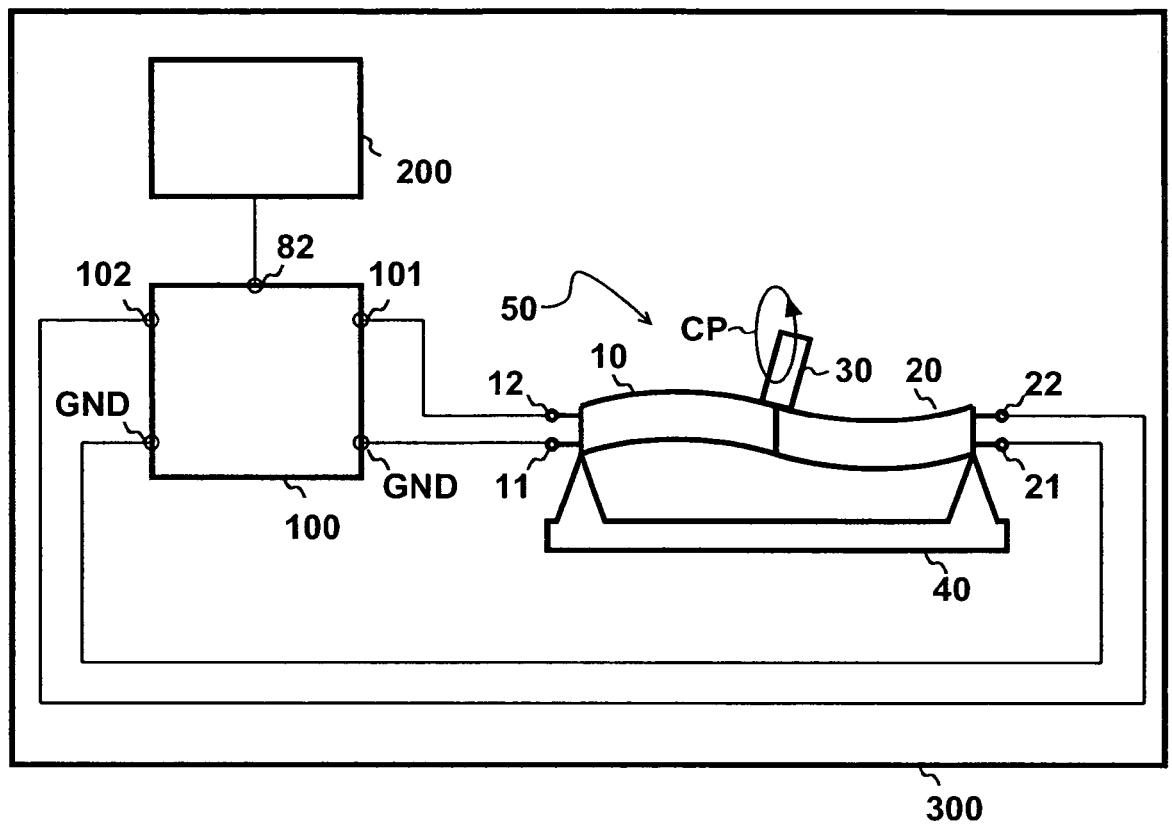
FIG. 5 shows a mobile device comprising a piezo-element driving device according to the present invention.

Referring to FIG. 5, the piezo-element driving device 100 may be used in a mobile device 300, in which a piezo-element driving device 100 is connected to a piezo-actuator 50. The piezo-actuator is preferably implemented using bimorphs in a way described in the patent application PCT/US03/17611. A control unit 200 is coupled to the control logic input 82 to control the direction and the speed of the actuator 50. The mobile device 300 may be for example a portable optical imaging system. In that case the mobile device 300 may comprise several piezo-element driving circuits 100 and piezo-actuators 50 to adjust the positions of several lens systems and optical components, in order to adjust the image magnification (zoom), the focus distance and the aperture of said portable optical imaging system. The use of the piezo-element driving circuit 100 according to the present invention is especially advantageous in mobile devices 300, because the piezo-elements 10, 20 can be driven at a voltage, which exceeds the available power supply voltage, energy is saved, the number of required voltage step-up means is minimized and internal power losses in the voltage step-up means are minimized.

Figure 6:
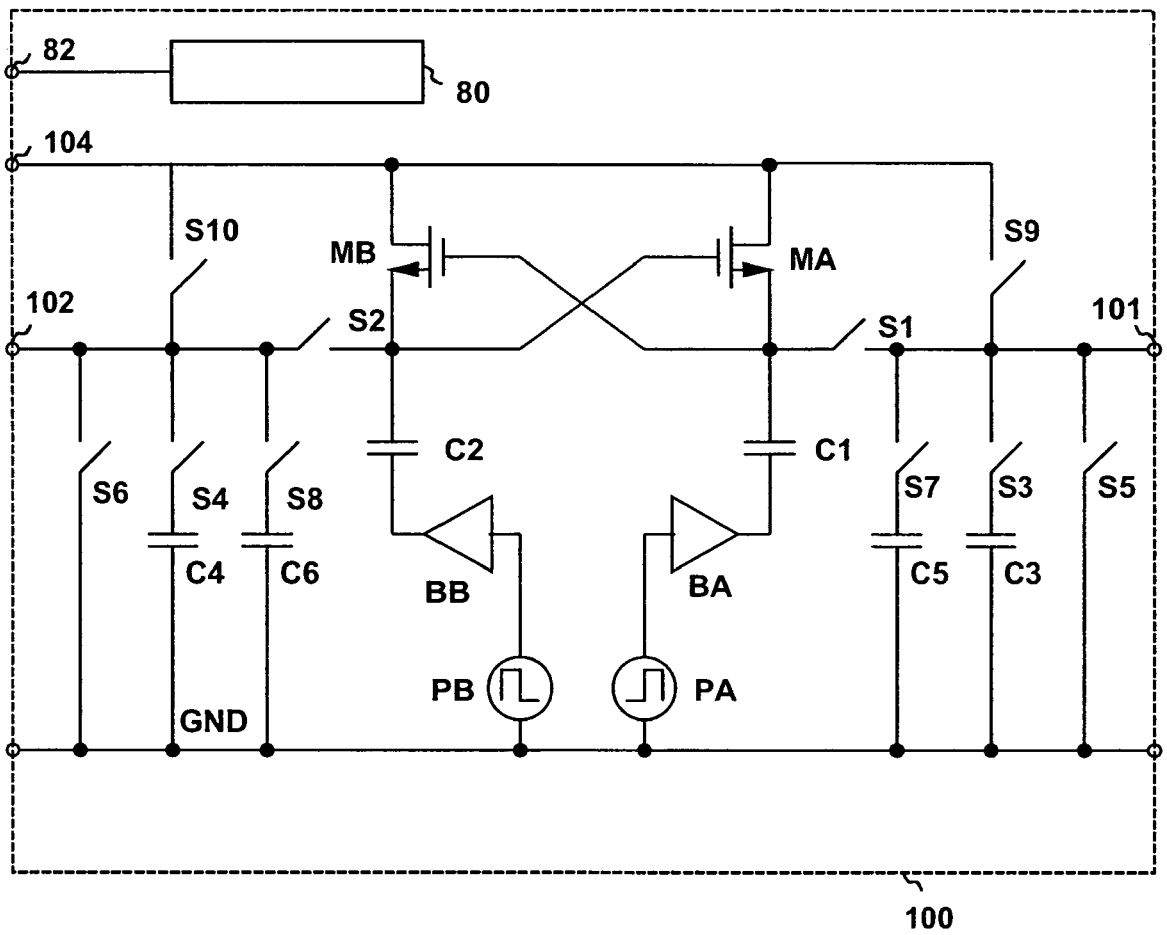
FIG. 6 shows the diagram of a piezo-element driving device according to the present invention with balancing capacitors.

FIG. 6 shows a further embodiment of the piezo-element driving device, comprising balancing capacitors C5, C6 and switching means S7, S8 to couple said capacitors C5, C6 to the respective outputs 101, 102. There is a small internal capacitance between the first piezo-element 10 and the second piezo-element 20, i.e. there is an internal capacitance between the terminals 12 and 22 of the piezo-electric actuator 50. Said internal capacitance may potentially cause a difference between the waveforms of the outputs 101 and 102. Said difference is remedied using the balancing capacitors C5, C6. One of the balancing capacitor C5, C6 is connected in parallel with the piezo-element 10, 20, which is in the leading phase, while the other balancing capacitor C5, C6 is disconnected. The balancing capacitor in the leading phase remains connected all the time during the uni-directional movement of the object moved by the piezo-electric actuator 50. Said balancing capacitor is disconnected and the other capacitor is connected only when the direction of the movement is reversed.

Figure 7:
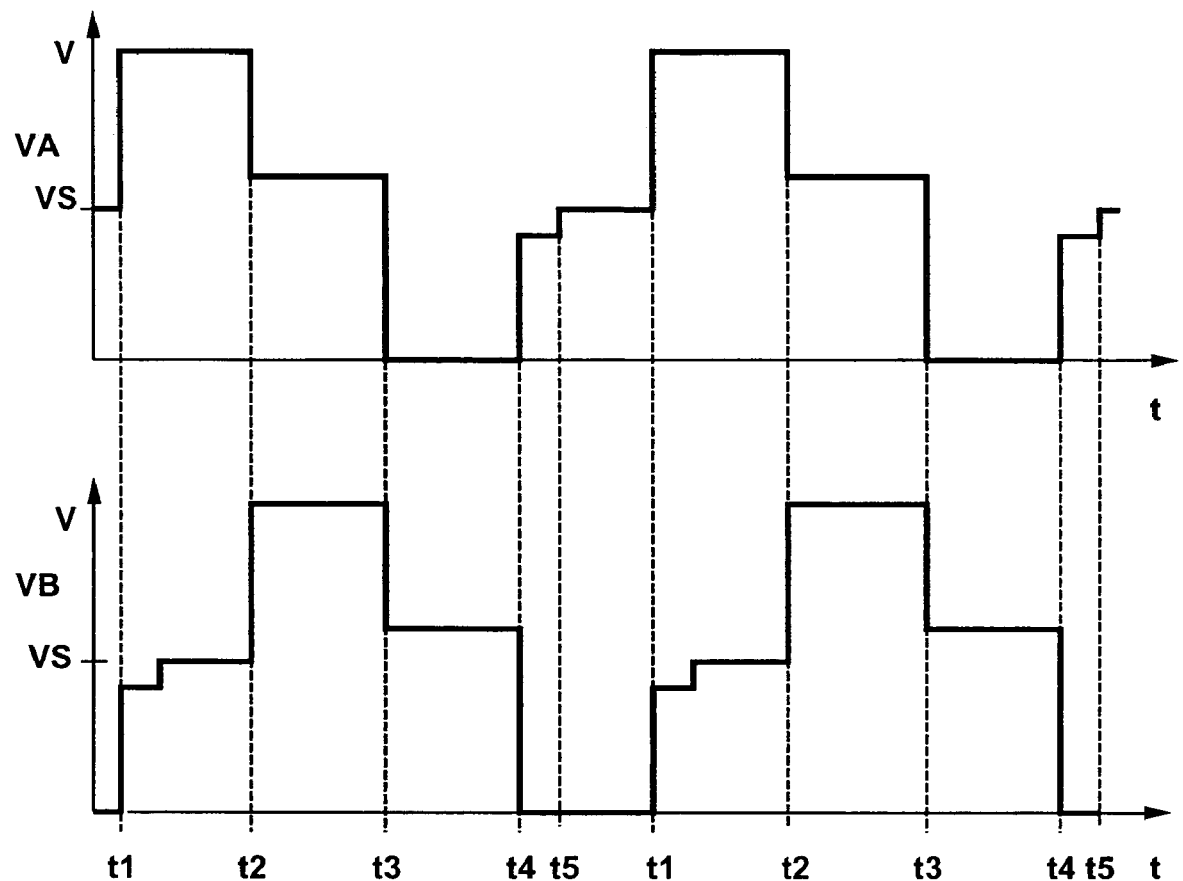
FIG. 7 shows by way of example the resulting voltage waveforms at the outputs of the piezo-element driving device, which comprises additional switches to connect the outputs of the piezo-element driving device to a power supply voltage

The actual voltage waveform of the outputs 101, 102 deviates significantly from the ideal sinusoidal waveform. FIG. 6 shows also further switches S9 and S10, which can be used to slightly correct the waveforms. In the fourth step, the voltage of the output 101 is lower than the power supply voltage VS. The waveform of the output 101 can be slightly corrected by inserting a fifth operating step after the fourth operating step. In said fifth operating step, the capacitor C3 is first disconnected from the output 101 by opening the switch S3, and subsequently the output 101 is connected to the power supply voltage VS by the switch S9. In other words, the voltage of the capacitor C3 remains lower than the power supply voltage VS, while the output is coupled to VS. The waveform of the output 102 can be corrected by opening the switch S4 and subsequently closing the switch S10, respectively. FIG. 7 shows by way of example the corrected waveforms. In FIG. 7, the marking t5 denotes the start of the fifth operating step.

The use of the piezo-element driving device 100 and the method according to the present invention is not limited to the driving of deflectable piezo-elements but may also be applied to drive expanding and contracting piezo-elements such as disclosed, for example, in U.S. Pat. No. 6,703,762.

A mobile device may comprise only one piezo-element driving unit 91, 92. However, in that case a further voltage step-up means should be used to provide driving voltage for the transistor MA, MB of said piezo-element driving unit 91, 92.

For the person skilled in the art, it will be clear that modifications and variations of the device and method according to the present invention are perceivable. The particular embodiments described above with reference to the accompanying drawings and tables are illustrative only and not meant to limit the scope of the invention, which is defined by the appended claims.

The invention claimed is:

1. An apparatus comprising two piezo-element driving units, each of the two piezo-element driving units comprising at least:
   an output connectable to a piezo-element,
   a voltage step-up module having a node wherein a voltage of said node is adapted to be an alternating voltage whose maximum is higher than a voltage of a power supply,
      a first switch to connect said output to said node for charging said piezo-element,
      at least one capacitor, and
      a second switch to connect said at least one capacitor to said output,
   said at least one capacitor being adapted to be disconnected from said node during said charging, and
   said second switch being adapted to transfer charge from said piezo-element to said at least one capacitor and back from said at least one capacitor to said piezo-element such that said at least one capacitor is disconnected from said voltage step-up module during the charge transfer in both directions;
   wherein the outputs of the two piezo-element driving units are in different phases.

2. The apparatus according to claim 1, wherein each of said piezo-element driving units is optimized to drive a piezo-element with a predetermined nominal internal capacitance, and the capacitance of at least one of said at least one capacitor is substantially equal to said predetermined nominal internal capacitance of said piezo-element.

3. The apparatus according to claim 1, each of the piezo-element driving units comprising:
   a control module configured to receive a direction command signal;
   a balancing capacitor and
   a switch to connect/disconnect said balancing capacitor to/from said output depending on said direction command signal.

4. The apparatus according to claim 1, wherein the voltage of said node of said voltage step-up module is arranged to alternate substantially in the voltage range VS to two times VS wherein VS is a primary power supply voltage.

5. The apparatus according to claim 1, wherein said voltage step-up module is implemented using a field-effect transistor.

6. The apparatus according to claim 5, wherein a further voltage step-up module is arranged to provide a driving signal for said field-effect transistor.

7. A piezo-element driving device comprising at least two piezo-element driving units, said at least two units being controlled by a common control unit and powered by a common power supply, each of said piezo-element driving units comprising at least:
   an output connectable to a piezo-element,
   a voltage step-up module having a node, wherein the voltage of said node is adapted to be an alternating voltage whose maximum is higher than a voltage of a power supply,
   a first switch to connect said output to said node for charging said piezo-element,
   at least one capacitor, and
   a second switch to connect said at least one capacitor to said output,
   said at least one capacitor being adapted to be disconnected from said node during said charging, and
   said second switch being adapted to transfer charge from said piezo-element to said at least one capacitor and back from said at least one capacitor to said piezo-element such that said at least one capacitor is disconnected from said voltage step-up module during the charge transfer in the both directions;
   wherein the outputs of the two piezo-element driving units are in different phases.

8. A method comprising:
   driving two piezo-elements with respective driving units and performing with each driving unit a process comprising:
   charging a piezo-element using a voltage step-up module having a node, wherein a voltage of said node is adapted to be an alternating voltage whose maximum is higher than a voltage of a power supply, and wherein at least one capacitor is disconnected from said node during said charging,
   transferring charge from said piezo-element to said at least one capacitor, said at least one capacitor being disconnected from said node during the charge transfer, and
   transferring charge back from said at least one capacitor to said piezo-element, said at least one capacitor being disconnected from said node during the charge transfers,
   wherein the piezo-elements are driving in different phases.

9. The method according to claim 8, wherein the capacitance of at least one of said at least one capacitor is selected to be substantially equal to the nominal internal capacitance of said piezo-element.

10. The method according to claim 8, wherein a balancing capacitor is connected/disconnected to/from said piezo-element depending on a direction command signal.

11. The method according to claim 8, wherein the voltage of said voltage step-up module alternates substantially in the voltage range VS to two times VS wherein VS is a primary power supply voltage.

12. The method according to claim 8, wherein said voltage step-up module is implemented using a field-effect transistor.

13. The method according to claim 12, wherein a driving signal for said field-effect transistor is provided by a further voltage step-up module.

14. The method according to claim 8, wherein two piezo-elements are driven with two output voltages in such a way, that there is a mutual phase difference between said two output voltages.

15. A device comprising at least:
   two piezo-elements, and
   respective piezo-element driving units for each of the two piezo-elements, each piezo-element driving unit comprising:

a voltage step-up module having a node, wherein a voltage of said node is adapted to be an alternating voltage whose maximum is higher than a voltage of a power supply, a first switch to connect said node to said piezo-element for charging said piezo-element, at least one capacitor, and a second switch to connect said at least one capacitor to said piezo-element, said at least one capacitor being adapted to be disconnected from said node during said charging, said second switch being adapted to transfer charge from said piezo-element to said at least one capacitor and back from said at least one capacitor to said piezo-element such that said at least one capacitor is disconnected from said voltage step-up module during the charge transfer in the both directions;

wherein the node of one of the piezo-element driving units is in different phase than the node of the other of the piezo-element driving units.

16. The device according to claim 15, wherein said device comprises at least one piezo-electric actuator, wherein said actuator comprises at least two bimorphs.

17. The device according to claim 15, wherein said device is a mobile device.

18. The device according to claim 15, wherein said piezo-element is arranged to adjust the position of a focusing or zoom lens system.

* * * * *